United States Patent [19]

Kanda

[11] Patent Number: 5,187,504
[45] Date of Patent: Feb. 16, 1993

[54] EYEGLASS FRAME HAVING HOLLOW ADJUSTABLE CONNECTOR

[75] Inventor: Kiyomi Kanda, Yao, Japan

[73] Assignee: David Huang, Tapei, Taiwan

[21] Appl. No.: 658,767

[22] Filed: Feb. 21, 1991

[51] Int. Cl.⁵ .................... G02C 5/08; G02C 5/04; G02C 5/22

[52] U.S. Cl. .................... 351/153; 351/63; 351/128

[58] Field of Search .................. 351/63, 113, 128, 153

[56] References Cited

U.S. PATENT DOCUMENTS

| | | | |
|---|---|---|---|
| 2,829,558 | 4/1958 | Ratti | 88/53 |
| 3,064,530 | 11/1962 | Vigano | 88/53 |
| 3,476,466 | 11/1969 | Hopkins | 351/115 |
| 3,533,687 | 10/1970 | Herzig | 351/121 |
| 3,874,775 | 4/1975 | Lazarus | 351/113 |
| 4,244,081 | 1/1981 | Beyer et al. | 16/128 |
| 4,547,048 | 10/1985 | Negishi | 351/137 |
| 4,570,289 | 2/1986 | Consolati | 16/228 |
| 4,617,698 | 10/1986 | Drlik | 16/228 |
| 4,674,147 | 6/1987 | Drlik | 16/228 |
| 4,689,851 | 9/1987 | Beyer | 16/228 |
| 4,740,069 | 4/1988 | Baum | 351/57 |
| 4,747,183 | 5/1988 | Drlik | 16/228 |
| 4,750,828 | 6/1988 | Sartor | 351/115 |
| 4,820,035 | 4/1989 | Kanda | 351/153 |

*Primary Examiner*—Rodney B. Bovernick
*Attorney, Agent, or Firm*—Darby & Darby

[57] ABSTRACT

An eyeglass frame includes a lens frame having a pair of opposed endpieces, two hollow connectors each having one end pivoted to one of the endpieces, and two elongated bows each having one end pivoted to the other end of one hollow connector. The elongated bows are turnable relative to the hollow connectors between a first bow position, wherein the elongated bows are aligned with the hollow connectors, and a second bow position, wherein the elongated bows are positioned transverse to and inward of the hollow connectors. The hollow connectors are turnable relative to the endpieces about a generally vertical plane between a first connector position, wherein the hollow connectors extend rearwardly and horizontally from the endpieces, and a second connector position, wherein the hollow connectors extend vertically downward from the endpieces. The hollow connectors can also be moved a small distance on a curved side surface of the endpieces along a generally horizontal plane to adjust the spacing between the elongated bows.

10 Claims, 5 Drawing Sheets

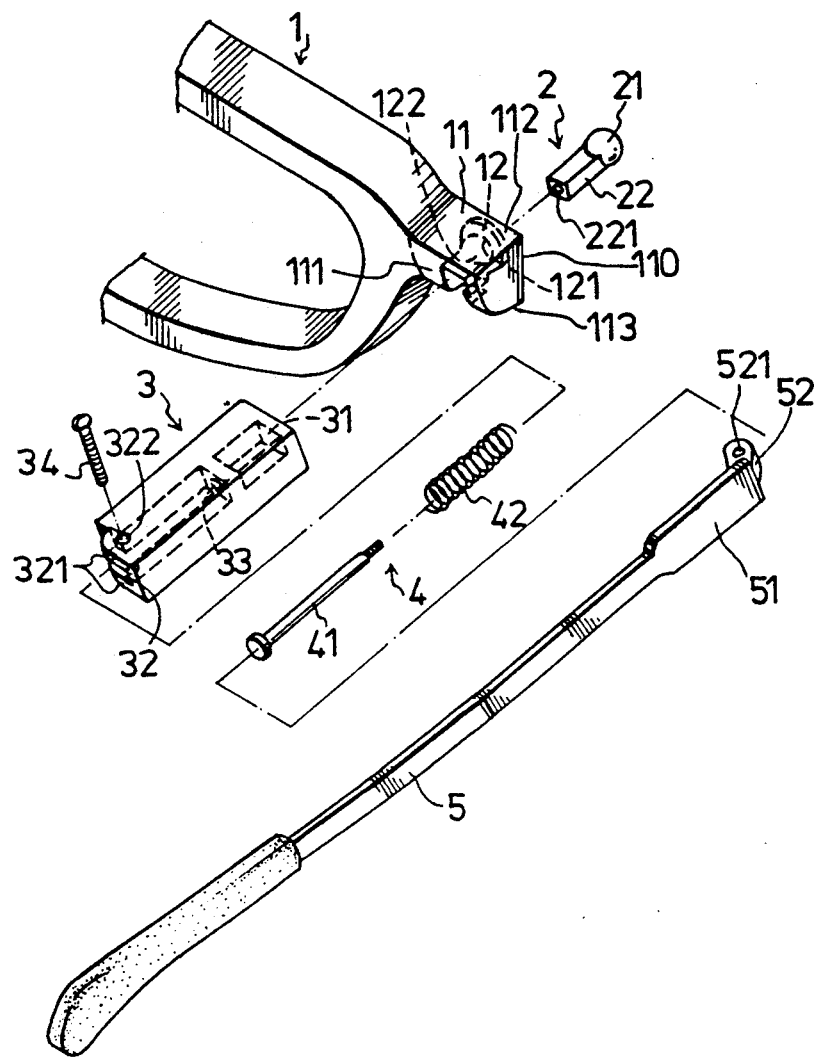
F I G. 2

EYEGLASS FRAME HAVING HOLLOW ADJUSTABLE CONNECTOR

BACKGROUND OF THE INVENTION

1. Field of the Invention

The invention relates to a frame for eyeglasses, more particularly to a foldable and adjustable eyeglass frame which can be conveniently stored and carried.

2. Description of the Related Art

A conventional eyeglass frame is comprised of a lens frame and a pair of elongated bows hinged to opposed endpieces provided on the lens frame. When folded, the frame is stored in a relatively thick casing which, oftentimes, is not convenient to carry.

Another disadvantage of conventional eyeglass frames is that the position of the elongated bows cannot be adjusted and maintained so as to achieve tight contact with the user's temples. Conventional eyeglass frames are thus unstable and can easily fall off the head of the user during use.

SUMMARY OF THE INVENTION

Therefore, the main objective of the present invention is to provide an eyeglass frame which has a reduced thickness when properly folded, making it more convenient to store and carry.

Another objective of the present invention is to provide an eyeglass frame which does not easily fall off the head of the user when worn and is more comfortable in use, the eyeglass frame having provisions to easily adjust the spacing between elongated bows thereof according to the user's needs.

Accordingly, the preferred embodiment of an eyeglass frame of the present invention comprises: a lens frame having a pair of opposed endpieces, each endpiece having a front side surface, a rear side surface, an upper side surface, a lower side surface, a curved side surface extending from the rear side surface to the lower side surface, and a counterbore extending through the endpiece from the front side surface to the rear side surface and having a generally hemispherical receiving portion adjacent to the front side surface, a thinner shaft-receiving portion extending rearwardly from the hemispherical receiving portion and up to the rear side surface, an enlarged portion extending forwardly from the hemispherical receiving portion and up to the front side surface, and a groove formed in the curved surface and communicated with the entire lengths of the shaft-receiving portion and the hemispherical receiving portion and with an end portion of the enlarged portion, the groove having a width approximate to that of the shaft-receiving portion of the counterbore; two pivot members, each having a ball portion fittingly received in the hemispherical receiving portion of the counterbore of one of the endpieces, and a shaft portion extending rearward from the ball portion and passing through the shaft-receiving portion of the counterbore; two hollow connectors, each having a pair of upper and lower outwardly extending projections provided on one end thereof, the shaft portion of the pivot members extending into the other end of the hollow connectors; biasing means associated with the hollow connectors and the pivot members to urge the hollow connectors to engage the curved side surface of the endpieces; and two elongated bows, each having a pivotable end projection rotatably hinged between the upper and lower projections of one of the hollow connectors.

The elongated bows are turnable relative to the hollow connectors between a first bow position, wherein the elongated bows are aligned with the hollow connectors, and a second bow position, wherein the elongated bows are positioned transverse to and inward of the hollow connectors. The hollow connectors are turnable relative to the endpieces about a generally vertical plane between a first connector position, wherein the hollow connectors extend rearwardly and horizontally from the endpieces, and a second connector position, wherein the hollow connectors extend vertically downward from the endpieces.

The shaft portion of each pivot member has a width slightly smaller than those of the shaft-receiving portion and the groove of the counterbore. Each of the hollow connectors can be moved a small distance on the curved side surface of the endpieces in a generally horizontal plane to adjust the spacing between the elongated bows.

BRIEF DESCRIPTION OF THE DRAWINGS

Other features and advantages of the present invention will become apparent in the following detailed description of the preferred embodiments with reference to the accompanying drawings, of which:

FIG. 2 is an exploded view of the first preferred embodiment of an eyeglass frame according to the present invention;

DETAILED DESCRIPTION OF THE PREFERRED EMBODIMENTS

Figure 1:
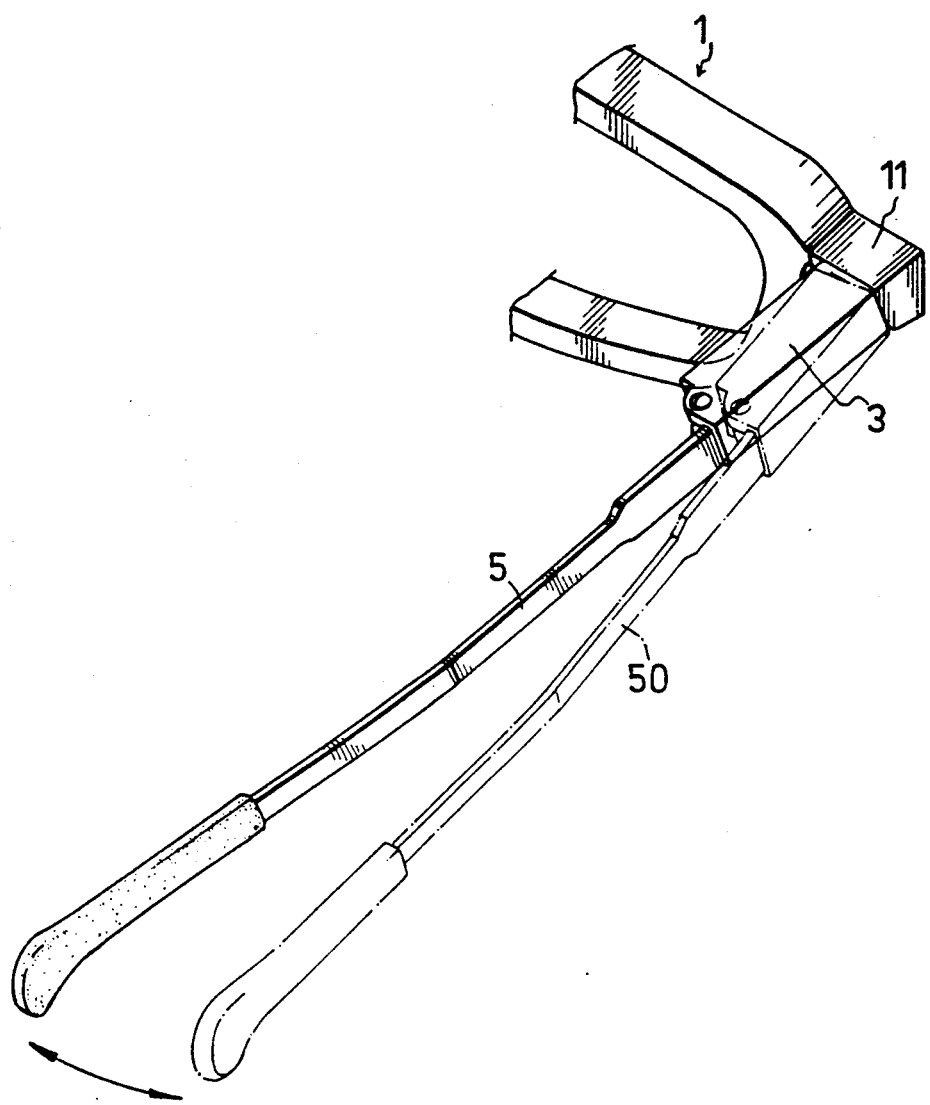
FIG. 1 is a perspective view of an eyeglass frame according to the present invention.
Figure 3:
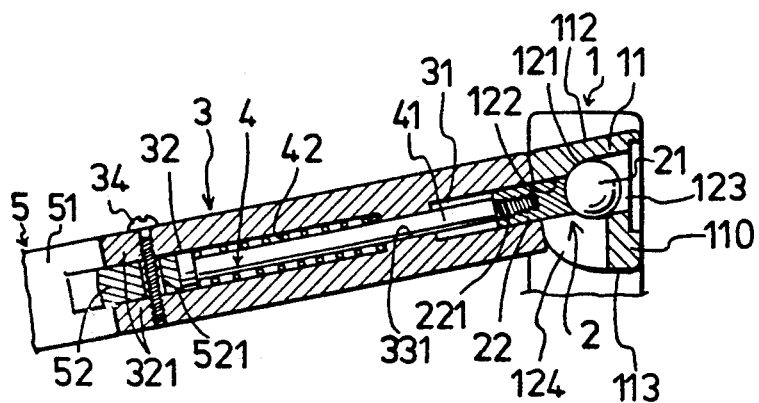
FIG. 3 is a sectional view of the first preferred embodiment illustrating the assembly thereof.

Referring to FIGS. 1, 2 and 3, the first preferred embodiment of an eyeglass frame according to the present invention is shown to comprise a lens frame 1, two pivot members 2, two hollow connectors 3, two biasing members 4, and a pair of elongated bows 5.

The lens frame 1 has two opposed endpieces 11, each of which having a front side surface 110, an upper side surface 112, a curved side surface including a rear side surface 111 and a lower side surface 113, and a counterbore 12 extending from the front side surface 110 to the rear side surface 111. The counterbore 12 has a generally hemispherical receiving portion 121 adjacent to the front side surface 110, a thinner shaft-receiving portion 122 extending rearwardly from the hemispherical receiving portion 121 and up to the rear side surface 111, an enlarged portion 123 extending forwardly from the hemispherical receiving portion 121 and up to the front side surface 110, and a groove 124 formed in the curved side surface and communicated with the entire lengths of the shaft-receiving portion 122 and the hemispherical receiving portion 121, and with the rear end portion of the enlarged portion 123. The width of the groove 124 is approximately equal to that of the shaft-receiving portion 122.

Each of the pivot members 2 has a ball portion 21 and a rectangular shaft portion 22 extending rearwardly from the ball portion 21. The ball portion 21 is fittingly received in the hemispherical receiving portion 121, while the shaft portion 22 is extended through the shaft-receiving portion 122. The distal end of the shaft portion 22 is provided with a threaded axial mounting hole 221.

Each of the hollow connectors 3 is substantially rectangular in cross section and confines a first axially extending receiving space 31 and a second axially extending receiving space 32. A partition member 33 is disposed between the first and second receiving spaces, 31 and 32, and is provided with an axial through hole 331 communicating the first and second receiving spaces, 31 and 32. One end of each hollow connector 3 adjacent to the second receiving space 32 is provided with upper and lower outward and axially extending projections 321. The upper and lower projections 321 are provided with aligned, threaded holes 322 which receive a screw 34.

Each of the biasing members 4 includes a bolt 41 received in each of the hollow connectors 3 and extending from the second receiving space 32 to the first receiving space 31 via the axial through hole 331 of the partition member 33. The bolt 41 has a head disposed inside the second receiving space 32, and a threaded end disposed inside the first receiving space 31 to engage the threaded mounting hole 221 of one of the pivot members 2. Each biasing member 4 further includes a spring 42 disposed inside each second receiving space 32 and around the bolt 41 between the head of the bolt 41 and the partition member 33. The biasing members 4 urge one end of the hollow connectors 3 to engage the curved side surface of the endpieces 11.

Each of the elongated bows 5 has one end 51 with a pivotable end projection 52 that is provided with a transversely extending through hole 521. Assembly of the first preferred embodiment is as follows: The pivot members 2 engage the endpieces 11 such that the ball portions 21 are fittingly received in the hemispherical receiving portions 121, and the shaft portions 22 extend through the shaft-receiving portions 122. The shaft portions 22 are then inserted in the first receiving spaces 31 of the hollow connectors 3. The springs 42 are placed inside the second axial receiving portions 32 and the bolts 41 extend from the second receiving spaces 32 to the first receiving spaces 31 via the partition members 33 to engage the threaded mounting holes 221 of the pivot members 2. The pivotable end projection 52 of each elongated bow 5 is then placed between the upper and lower projections 321 of one hollow connector 3, and screws 34 passing through the through hole 521 of the pivotable end projection 52 and the threaded holes 322 of the upper and lower projections 321 are used to pivotably mount the elongated bows 5 on the hollow connectors 3.

The biasing members 4 urge the hollow connectors 3 toward the endpieces 11. The width of the shaft portion 22 of the pivot members 2 is slightly smaller than those of the shaft-receiving portion 122 and the groove 124 to permit slight movement of the hollow connectors 3 on the curved side surface of the endpieces about a generally horizontal plane. Slight adjustments may therefore be made so that the hollow connectors 3 or the elongated bows 5 can make contact with the temple of the user. Thus, the eyeglass frame of the present invention does not easily fall off during use. The degree of contact with the user's temple is adjustable depending upon the user's needs.

Figure 4:
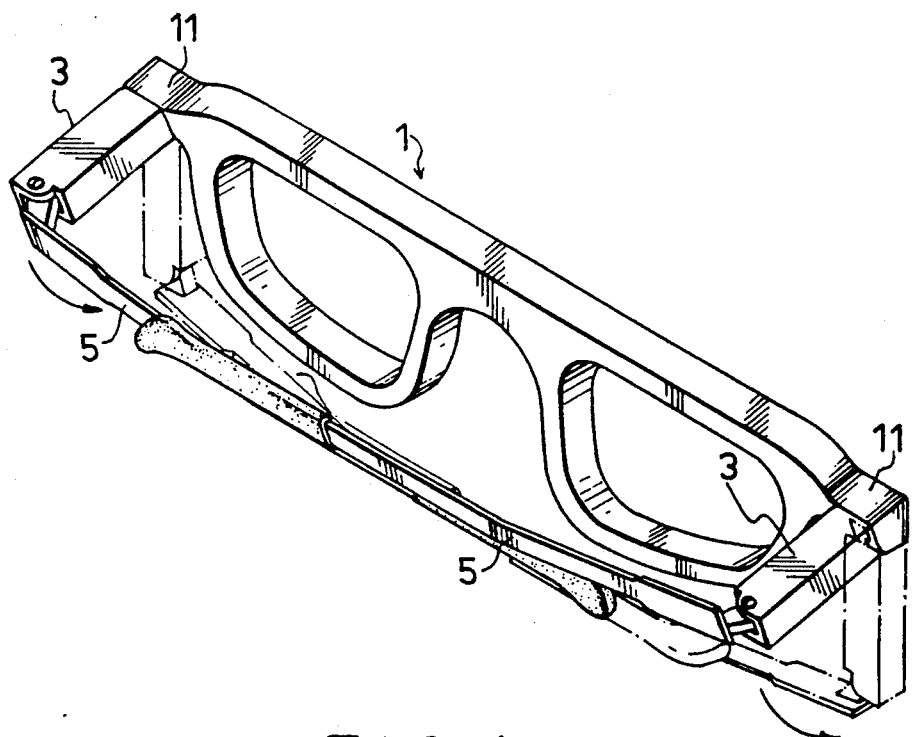
FIG. 4 is a perspective view illustrating the proper folding method of the eyeglass frame according to the present invention.

Referring to FIGS. 2, 3 and 4, when storing the eyeglass frame of the present invention, the elongated bows 5 are firstly folded from a first bow position, wherein the elongated bows 5 are aligned with the hollow connectors 3, to a second bow position, wherein the elongated bows 5 are positioned transverse to and inward of the hollow connectors 3. The hollow connectors 3 are then folded from a first connector position, wherein the hollow connectors 3 extend rearwardly and horizontally from the endpieces 11, to a second connector position, wherein the hollow connectors 3 extend vertically downward from the endpieces 11. The thickness of the eyeglass frame of the present invention when folded is thus much less than that of conventional eyeglass frames.

Figure 5:
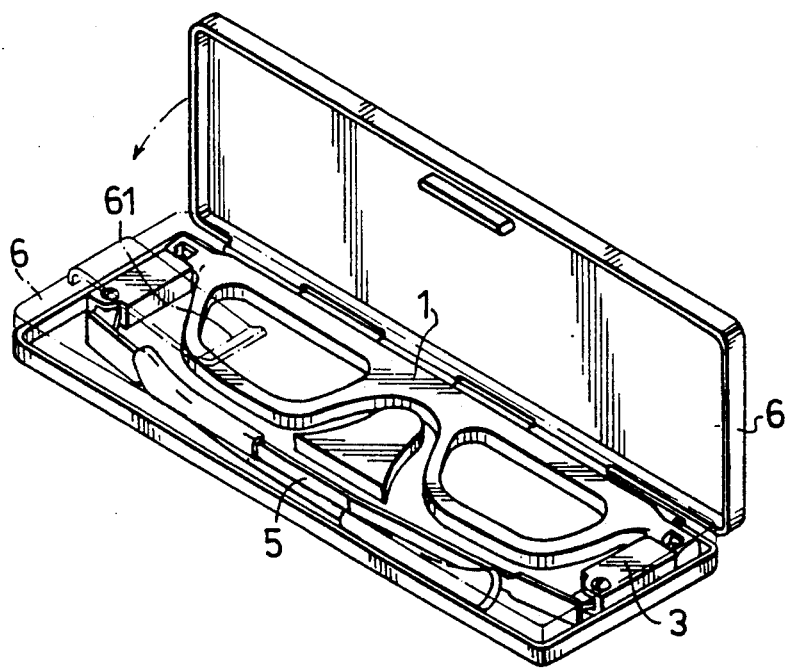
FIG. 5 is a perspective view of the folded eyeglass frame when stored in a casing.

Referring to FIG. 5, the folded eyeglass frame is stored in a relatively thin casing 6. The casing 6 may be provided with a hook 61 so that said casing 6 may be suspended on the belt of a user. This illustrates the storage and carrying convenience arising from use of the eyeglass frame of the present invention.

Figure 6:
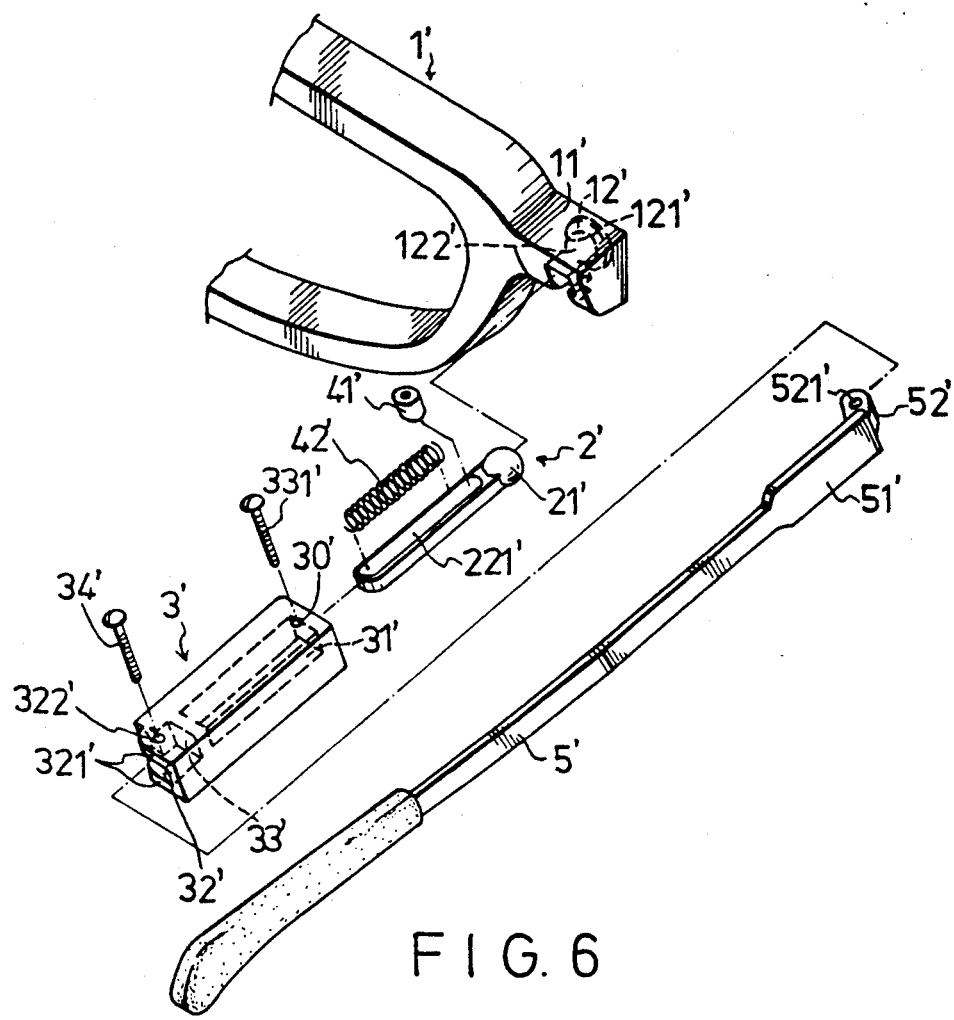
FIG. 6 is an exploded view of the second preferred embodiment of an eyeglass frame according to the present invention.

Referring to FIG. 6, the second preferred embodiment of an eyeglass frame according to the present invention is shown to similarly comprise a lens frame 1', two pivot members 2', two hollow connectors 3', two biasing members 4', and a pair of elongated bows 5'.

The lens frame 1' is similar in construction to the lens frame 1 of the first preferred embodiment and will not be detailed further.

Each of the pivot members 2' has a ball portion 21' on one end, and a shaft portion 22' on the other end. The shaft portion 22' has a top side provided with an elongated axially extending opening 221'.

Each of the hollow connectors 3' is substantially rectangular in cross section and confines a first receiving space 31' and a second receiving space 32'. A partition member 33' is disposed between the first and second receiving spaces 31' and 32'. One end of each hollow connector 3' adjacent to the second receiving space 32' is provided with upper and lower outward and axially extending projections 321'. The upper and lower projections 321' are provided with aligned, threaded holes 322' which receive a screw 34'. A radial threaded hole 30' is provided adjacent to the other end of each hollow connector 3' to access the first receiving space 31'. A screw 331' engages the threaded hole 30'.

Each of the biasing members 4' includes a screw seat 41' slidably disposed on one end of the elongated opening 221' adjacent to the ball portion 21', and a spring 42' similarly received in the elongated opening 221' between the screw seat 41' and the other end of the elongated opening 221'. The screw seat 41' has an axial threaded bore 411'.

Figure 7:
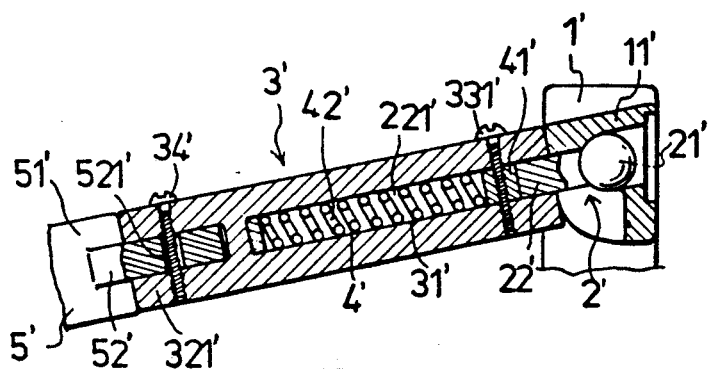
FIG. 7 is a sectional view of the second preferred embodiment illustrating the assembly thereof.

Each of the elongated bows 5' has one end 51 with a pivotable end projection 52' that is provided with a transversely extending through hole 521'. Assembly of the second preferred embodiment is as follows: Referring to FIGS. 6 and 7, the screw seat 41' and the spring 42' are provided in the elongated opening 221'. The pivot members 2' engage the endpieces 11' such that the ball portions 21' are fittingly received in the hemispherical receiving portions 121', and the shaft portions 22' extend through the shaft-receiving portions 122'. The shaft portions 22' are then inserted in the first receiving spaces 31' of the hollow connectors 3'. The screws 331' engage the radial threaded hole 30' and the screw seat 41'. The springs 42' thus urge the hollow connectors 3' to engage the endpieces 11'. The pivotable end projection 52' of each elongated bow 5' is then placed between the upper and lower projections 321' of one hollow connector 3' such that the through hole 521' is aligned with the threaded holes 322'. Finally, the screws 34' engage the threaded holes 322' and pass through the through hole 521' of the elongated bows 5' to pivotably mount the elongated bows 5' on the hollow connectors 3'. The operation of the second preferred embodiment is substantially similar to that of the first preferred embodiment and will not be detailed herein.

The advantages stemming from the use of the eyeglass frame according to the present invention are as follows:

1. The thickness of the eyeglass frame when properly folded is much less than those of conventional eyeglass frames, thereby making the present invention more convenient to store and carry.

2. The eyeglass frame does not easily fall off the head of the user and is more comfortable to wear since the distance between the elongated bows may be adjusted according to the user's needs.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. An eyeglass frame, comprising:
a lens frame having a pair of opposed endpieces, each of said endpieces having a front side surface, a rear side surface, an upper side surface, a lower side surface, a curved side surface extending from said rear side surface to said lower side surface, and a counterbore extending through said endpiece from said front side surface to said rear side surface, said counterbore having a generally hemispherical receiving portion adjacent to said front side surface, a thinner shaft-receiving portion extending rearwardly from said hemispherical receiving portion and up to said rear side surface, an enlarged portion extending forwardly from said hemispherical receiving portion and up to said front side surface, and a groove formed in said curved surface and communicated with the entire lengths of said shaft-receiving portion and said hemispherical receiving portion and with an end portion of said enlarged portion, said groove having a width approximate to that of said shaft-receiving portion of said counterbore;
two pivot members, each of said pivot members having a ball portion fittingly received in said hemispherical receiving portion of said counterbore of one of said endpieces and a shaft portion extending rearward from said ball portion and passing through said shaft-receiving portion of said counterbore;
two hollow connectors, each of said hollow connectors having a pair of upper and lower outwardly extending projections provided on one end thereof, said shaft portion of said pivot members extending into the other end of said hollow connectors;
biasing means associated with said hollow connectors and said pivot members to urge said hollow connectors to engage said curved side surface of said endpieces; and
two elongated bows, each of said elongated bows having a pivotable end projection rotatably hinged between said upper and lower projections of one of said hollow connectors;
whereby, said elongated bows are turnable relative to said hollow connectors between a first bow position, wherein said elongated bows are aligned with said hollow connectors, and a second bow position, wherein said elongated bows are positioned transverse to and inward of said hollow connectors, and said hollow connectors are turnable relative to said endpieces about a generally vertical plane between a first connector position, wherein said hollow connectors extend rearwardly and horizontally from said endpieces, and a second connector position, wherein said hollow connectors extend vertically downward from said endpieces.

2. The eyeglass frame as claimed in claim 1, wherein said shaft portion of each said pivot member has a width slightly smaller than those of said shaft-receiving portion and said groove of said counterbore; whereby, each of said hollow connectors can be moved a small distance on said curved side surface of said endpieces in a generally horizontal plane.

3. The eyeglass frame as claimed in claim 1, wherein:
each of said hollow connectors has a first axially extending receiving space adjacent to said endpieces, a second axially extending receiving space adjacent to said elongated bows, and a partition member disposed between said first and said second receiving spaces, said partition member having an axial through hole formed therein;
said shaft portion of each said pivot member has a distal end provided with a threaded axial mounting hole and extending into said first receiving space; and
said biasing means includes a bolt received in each of said hollow connectors, said bolt extending from said second receiving space to said first receiving space via said axial through hole, said bolt having a head disposed inside said second receiving space and a threaded end inside said first receiving space to engage said threaded mounting hole, said biasing means further including a spring similarly received in each of said hollow connectors, said spring being disposed inside said second receiving space and around said bolt between said head and said partition member.

4. The eyeglass frame as claimed in claim 1, wherein:
said shaft portion has a top side provided with an elongated axial opening;
each of said hollow connectors has a radial threaded hole; and
said biasing means includes a pair of screw seats each being slidably provided on one end of said elongated opening adjacent to said ball portion and having an axial threaded bore to be aligned with said radial threaded hole, a pair of springs each being disposed in said elongated opening between said screw seat and the other end of said elongated opening, and a pair of screws to fasten said screw seats to said hollow connectors.

5. An eyeglass frame comprising:

a lens frame having length, a bottom and a pair of opposed endpieces;

a pair of elongated bows;

a pair of elongated connectors respectively located between a bow and an endpiece for connecting the two bows to the two endpieces, each of the connectors having opposed ends and having a length from end-to-end approximately equal to the distance of the end pieces from the bottom of the lens frame, a pair of pivot means, each of said pivot means extending through a respective endpiece and engaging one of the opposed connector ends for respectively securing the pair of connectors to the opposed endpieces for pivotal movement in a vertical plane between a first position in which the connectors extend transversely to the general plane of the lens frame, and a second position in which the connectors lie in the plane of the lens frame and adjacent the opposite sides thereof, respectively, and joining means at the other of the opposed connector ends for securing a respective bow for pivotal movement between a position aligned with the respective connector and a position extending transversely to the respective connector and parallel to the length of the lens frame;

whereby when both said connectors are in said second position thereof and both said bows are in said transverse positions, said bows lie substantially in the plane of the frame, said pair of connectors being selectively and releasably positionable in the length direction of said lens frame at a connection between said connectors and said lens frame for adjusting a distance between the elongated bows in accordance with the width of the head of the eyeglass user.

6. The eyeglass frame as in claim 5, wherein each said connector abuts, and is adjustable along, a respective curved surface of said lens frame at said connection between said connector and said lens frame, said respective surfaces curving in the length direction of said lens frame.

7. An eyeglass frame comprising:

a lens frame having a pair of opposed endpieces;

a pair of elongated bows;

a pair of elongated connectors for connecting the two bows to the two endpieces, respectively, each of the pair of connectors having opposed ends and having a length from end-to-end approximately equal to the height of the endpieces above the lowermost portion of the lens frame, a pair of pivot means at one of the opposed ends for respectively securing the pair of connectors to the opposed endpieces for pivotal movement in a vertical plane between a first position in which the connectors extend transversely to the general plane of the lens frame, and a second position in which the connectors lie in the plane of the lens frame and adjacent the opposite sides thereof, respectively, and joining means at the other of the opposed connector ends for securing a respective bow for pivotal movement between a position aligned with the respective connector, and a position extending transversely to the respective connector and parallel to a longitudinal extent of the lens frame, when said connectors are in said second position thereof and said bows are in said position in which they extend transverse to said connectors, said bows lie substantially in the plane of the frame, said pair of pivot means including means for adjusting a distance between the elongated bows in accordance with the width of the head of the eyeglass user, each of said endpieces having front, rear upper and lower side surfaces, a bore having a hemispherical receiving portion adjacent to the front surface and having a first dimension and a shaft-receiving portion extending rearwardly of the hemispherical receiving portion to the rear side surface and having a second dimension which is less than the first dimension, and a curved groove extending from the shaft-receiving portion of the bore to the lower side surface and having a width substantially equal to the second dimension, each of the pair of pivot means having a ball portion received in the hemispherical receiving portion of the bore and a shaft portion extending from the ball portion, received in the shaft-receiving portion of the bore, and connected with a respective connector, the shaft portion of the pivot element being moveable vertically i the curved groove to pivot a respective connector between the first and second positions thereof.

8. The eyeglass frame as claimed in claim 7, wherein the shaft portion of each pivot means defines, together with the shaft portion of the other of said pair of pivot means, the adjusting means, and has a third dimension less than the second dimension whereby the shaft portion can move sidewise in the shaft-receiving portion of the endpiece bore for adjusting the distance between the bows in accordance with the width of the head of the eyeglass user.

9. The eyeglass frame as claimed in claim 7, wherein each of the connectors has a shoulder located between the opposed ends thereof and defining first and second axial openings at the one and the other of the opposed ends, respectively, the shaft portion of each of the pivot members having an end portion fixedly received in the second axial opening, and each of the connectors further including a spring located in the first axial opening for biasing the connector to a respective end piece.

10. The eyeglass frame as claimed in claim 9, wherein the end portion of the shaft portion of each pivot member has a threaded opening, the eyeglass frame further comprising two bolts extending in the two connectors for securing the shaft portions of respective pivot elements in the second openings of respective connectors to thereby secure the connectors to the endpieces, each of the springs extending between a head of a respective bolt and shoulders of respective connectors.

* * * * *